A. JENNESS.
SPRING TIRE.
APPLICATION FILED FEB. 1, 1912.
1,058,593.
Patented Apr. 8, 1913.
2 SHEETS—SHEET 2.
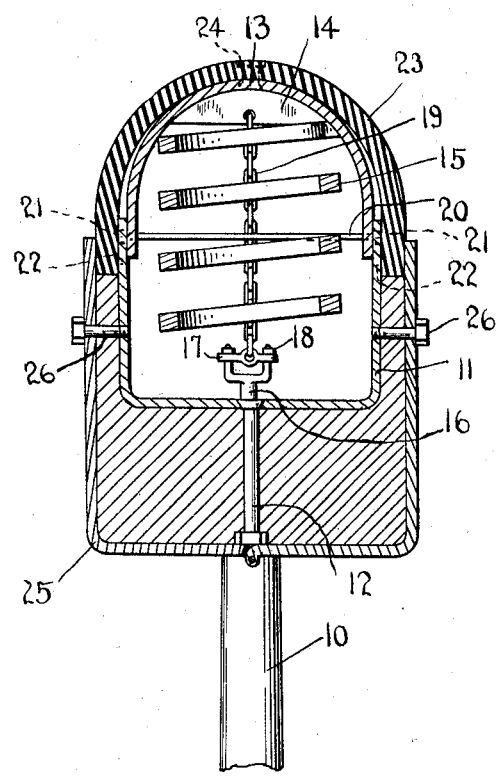
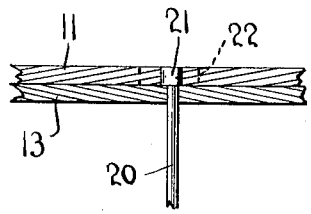
Witnesses
L. B. James
Francis Boyle
Inventor
Arthur Jenness
By
Attorneys

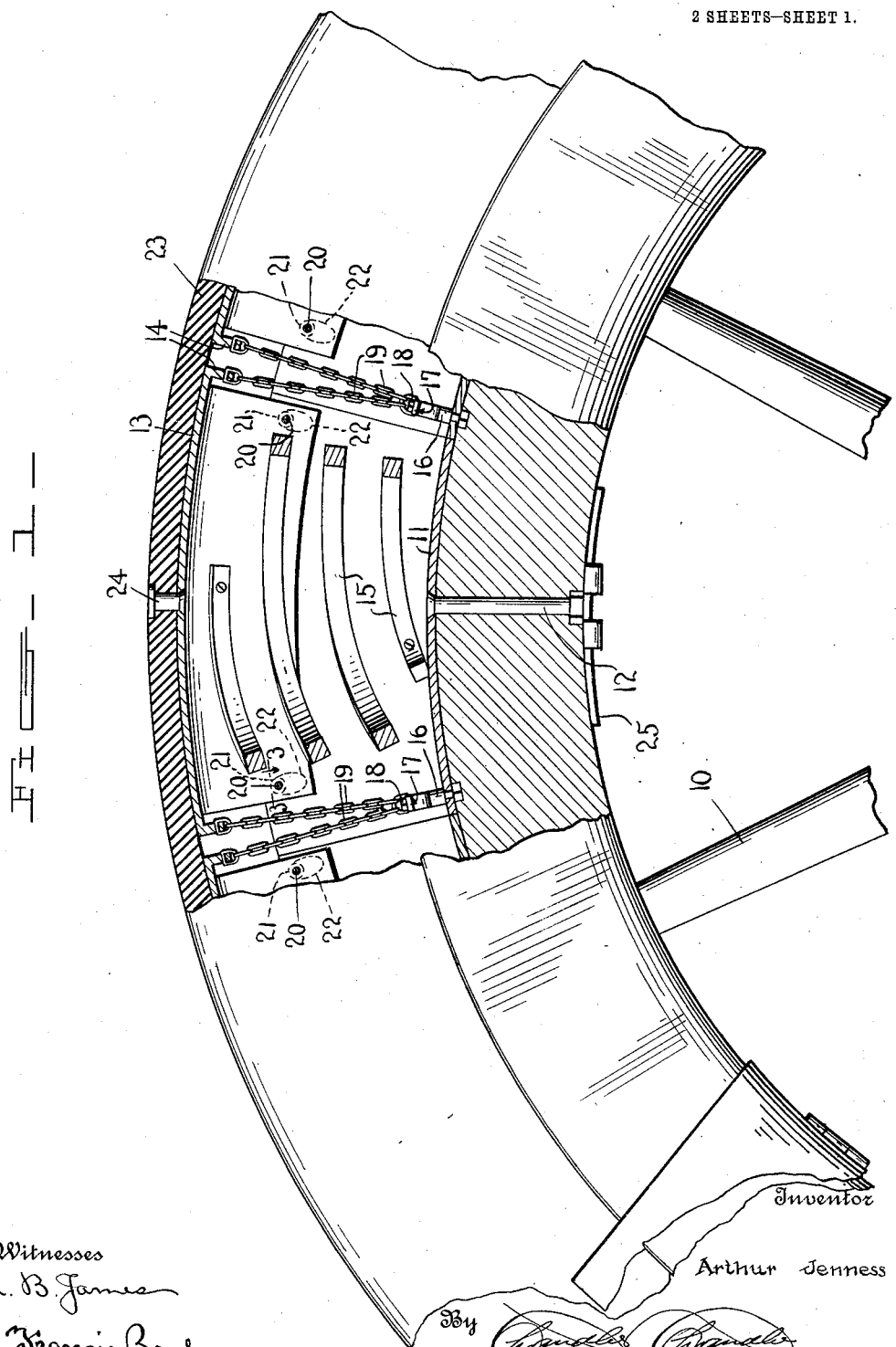

UNITED STATES PATENT OFFICE.

ARTHUR JENNESS, OF BOUNDBROOK, NEW JERSEY.

SPRING-TIRE.

1,058,593.  Specification of Letters Patent.  Patented Apr. 8, 1913.

Application filed February 1, 1912. Serial No. 674,678.

*To all whom it may concern:*

Be it known that I, ARTHUR JENNESS, a citizen of the United States, residing at Boundbrook, in the county of Somerset, State of New Jersey, have invented certain new and useful Improvements in Spring-Tires; and I do hereby declare the following to be a full, clear, and exact description of the invention, such as will enable others skilled in the art to which it appertains to make and use the same.

This invention relates to spring wheels and has for its object to provide a metallic inner tube for automobile and like tires, this inner tube being composed of telescoping sections normally held apart by springs interposed between the sections, novel means being employed to prevent creeping of the sections and to prevent a too great extending movement of the sections.

With the above object in view the invention consists of the novel details of construction and combination of parts hereinafter fully described and claimed, it being understood that various modifications may be made in the minor details of construction within the scope of the appended claims.

In the accompanying drawings forming part of this specification, Figure 1 is a side elevation of the spring tire partly in longitudinal section. Fig. 2 is a cross section of the tire and rim taken centrally through one of the sections. Fig. 3 is a fragmentary cross sectional view taken on the line 3—3 Fig. 1.

Referring now to the drawing in which like characters of reference designate similar parts, 10 designates in general a vehicle wheel the rim of which is channeled as shown. In the channel of the rim is a metallic inner tube formed of a plurality of similar telescoping sections, and as the telescoping sections are all identical in construction, but one will be minutely described. Each section comprises a U-shaped base member 11 fitting in the channel of the rim and bolted to the latter as shown at 12. A U-shaped cap member 13 is arranged to arch over and telescope into the base member, and the bridge of the cap member is considerably elongated and then bent abruptly in the direction of the base member to form legs 14 at the opposite ends of the cap member. A stiff helical spring 15 is situated between the members and holds them normally extended. For limiting extending movement of the members, a Y pin 16 is bolted to the bridge of the base member. The legs of the Y pin are threaded, and a yoke piece 17 is provided with suitable openings to loosely receive the legs of the pin, nuts 18 being advanced on the pin legs and retaining the yoke thereon. By advancing the nuts 18 upon the pin legs to any desired extent the yoke may be moved downward toward the base member 11 to adjust the hereinafter described chains. The yoke is provided centrally with an eye which receives the terminal links of divergent chains 19, the outer end of one chain being secured to the leg of the cap piece that interfits with the bolt holding base member, and the free end of the mating chain being engaged with the leg of the cap member of the next adjacent section as clearly shown in Fig. 1. The chains normally limit extending movement of the sections due to the action of the telescoping members.

For preventing creeping of the cap member relatively to the base member, bolts 20 are passed transversely through the legs of the cap member, each being equipped at its opposite ends with rollers 21 which work in substantially oval slots 22 formed in the legs of the base member. These rollers guide the cap member in its telescoping and extending movement and by engaging the sides of the slot prevent creeping movement of the cap member relatively to the base member. Should these rollers become broken off the chains carried by the Y pins will perform the function of preventing creeping of the cap member.

A rubber outer tube 23 is arranged to embrace the cap members of all the sections and extend downward upon the base members of all the sections as shown in Fig. 2, the longitudinal edges of the tube abutting the periphery of the wheel rim. The tube may be riveted as shown at 24 or otherwise secured to the cap members of the sections, and for holding the longitudinal edge portions of the tube in engagement with the legs of the base members of all the sections, a plurality of U-shaped clamp members 25 are arranged to embrace the rim of the vehicle wheel of adjacent spokes, the legs of the member engaging with the longitudinal edge portions of the tube and forcing said portions into tight engagement with the legs of the base members of all the sections. Screws 26 or the like may be passed through the legs of each clamp member and into the rim to anchor the member in position. In order to facilitate mounting the clamp members, each member is formed of two approximately J-shaped sections hingedly connected together at the longitudinal edges of their curved portions as shown in Fig. 2.

Before the application of the clamp members the metallic inner tube formed of the similar sections above described, is filled with tar or other viscous material, this material protecting the springs from frost in cold climates and also forming a lubricant for the rollers.

What is claimed, is:—

1. An inner tube for tires including a plurality of independent sections adapted to be arranged in a circular series on a vehicle wheel, each section comprising a channeled base member and a channeled cap member mounted for relative telescoping movement, a helical spring interposed between said members and holding the members normally in extended relative position, rollers carried by the legs of each cap member working in slots formed in the legs of the related base member, and guiding the members in their telescoping movement, and substantially V-shaped limp connectors each terminally secured to and connecting the confronting ends of adjacent cap members, and each secured at the bight to the base member of one of said cap members.

2. A vehicle tire including in combination with a vehicle wheel rim, an inner tube composed of a plurality of independent telescoping sections arranged in a circular series upon said wheel rim, each section comprising a channeled base member anchored to said rim, a channeled cap member interfitting with and movable toward and away from said base member, a spring interposed between said members and holding the members normally spaced apart, each cap member being provided at its opposite ends with extensions projecting in the direction of the related base member, each base member being provided adjacent to its opposite ends with pins projecting in the direction of said extensions, and substantially V-shaped limp connectors terminally secured to the extensions of adjacent cap members, and adjustably secured at the bights to said pins.

In testimony whereof, I affix my signature, in presence of two witnesses.

ARTHUR JENNESS.

Witnesses:
 JACOB SIEGEL,
 LESTER SIEGEL.

Copies of this patent may be obtained for five cents each, by addressing the "Commissioner of Patents, Washington, D. C."